US012678889B2

(12) United States Patent
Fukumitsu et al.

(10) Patent No.: US 12,678,889 B2
(45) Date of Patent: Jul. 14, 2026

(54) LASER PROCESSING DEVICE AND METHOD FOR ADJUSTING FOCAL POSITION OF LASER BEAM USING SAME

(71) Applicant: Panasonic Intellectual Property Management Co., Ltd., Osaka (JP)

(72) Inventors: Yoichi Fukumitsu, Osaka (JP); Takayasu Ohara, Hyogo (JP); Masatoshi Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 735 days.

(21) Appl. No.: 18/174,604

(22) Filed: Feb. 24, 2023

(65) Prior Publication Data

US 2023/0219166 A1 Jul. 13, 2023

Related U.S. Application Data

(63) Continuation of application No. PCT/JP2021/036992, filed on Oct. 6, 2021.

(30) Foreign Application Priority Data

Dec. 22, 2020 (JP) ................................ 2020-212721

(51) Int. Cl.
B23K 26/035 (2014.01)
B23K 26/08 (2014.01)

(52) U.S. Cl.
CPC ........ B23K 26/035 (2015.10); B23K 26/0884 (2013.01)

(58) Field of Classification Search
CPC .. B23K 26/035; B23K 26/705; B23K 26/046; B23K 26/0884; B23K 26/0876
See application file for complete search history.

(56) References Cited

U.S. PATENT DOCUMENTS

| | | | | |
|---|---|---|---|---|
| 6,657,156 B2 * | 12/2003 | Kubota | ................ | B23K 26/044 |
| | | | | 219/121.78 |
| 2005/0107918 A1 * | 5/2005 | Watanabe | .............. | B25J 9/1684 |
| | | | | 700/264 |
| 2019/0151988 A1 | 5/2019 | Murakami | | |

FOREIGN PATENT DOCUMENTS

| | | | |
|---|---|---|---|
| JP | 2000042775 A | * | 2/2000 |
| JP | 2019-093399 | | 6/2019 |
| JP | 2020-104168 | | 7/2020 |

OTHER PUBLICATIONS

Machine Translation of Onodera, performed on Dec. 7, 2025. (Year: 2000).*

(Continued)

*Primary Examiner* — Brian W Jennison
(74) *Attorney, Agent, or Firm* — Wenderoth, Lind & Ponack, L.L.P.

(57) ABSTRACT

Laser processing device (100) includes a laser oscillator that generates laser beam (LB), laser head (60) that irradiates a workpiece with laser beam (LB), and manipulator (40) on which laser head (60) is mounted. Manipulator (40) includes robot arm (41), arm tip shaft (J6) provided at a tip of robot arm (41) in a manner rotatable about axis (RA), and connector component (50) that connects arm tip shaft (J6) and laser head (60). Connector component (50) is provided with gauge attachment portion (51a) to which gauge (80) is attached removably. Gauge (80) has a reference point corresponding to the focal position of laser beam (LB).

8 Claims, 11 Drawing Sheets

(56)         References Cited

OTHER PUBLICATIONS

International Search Report of PCT application No. PCT/JP2021/
036992 dated Dec. 14, 2021.

* cited by examiner

LB(GLB)

UP

FRONT ⟷ REAR X

DOWN
Z

FIG. 6C

LASER PROCESSING DEVICE AND METHOD FOR ADJUSTING FOCAL POSITION OF LASER BEAM USING SAME

TECHNICAL FIELD

The present disclosure relates to a laser processing device, and to a method for adjusting the focal position of a laser beam using the laser processing device.

BACKGROUND ART

Conventionally, a technique that performs laser processing while moving a laser head using a robot has been widely known. In such a configuration, in order to perform processing as intended, it is necessary to match the focal position of the actual laser beam emitted from the laser head to a focal position of a laser beam, set in the robot or a controller of the robot.

PTL 1 discloses a laser processing device using a Galvanometer scanner. By the adjustment of positioning of a condenser lens, using a lens drive mechanism provided to the Galvanometer scanner, a precise laser beam focal position adjustment in the optical axis direction is made possible. A precise laser beam focal position adjustment in the direction orthogonal to the optical axis direction is made possible by the use of the Galvanometer mirror that is connected to a motor.

Furthermore, PTL 2 disclose a method for adjusting the focal position of a laser beam using a jig having a slit and a pinhole.

CITATION LIST

Patent Literature

PTL 1: Unexamined Japanese Patent Publication No. 2019-093399

PTL 2: Unexamined Japanese Patent Publication No. 2020-104168

SUMMARY OF THE INVENTION

Technical Problems

However, the Galvanometer scanner disclosed in PTL 1 is expensive. With an inexpensive laser processing device without a Galvanometer scanner, by contrast, it is necessary to move the laser head itself to match the focal position of the actual laser beam with the focal position set in a robot, or to measure the focal position of the actual laser beam and to set the focal position to the robot. Such a process has involved troublesome and complicated tasks, and has been costly.

Moreover, in the method disclosed in PTL 2, in order to adjust the focal position of the laser beam, it has been necessary to establish the positioning of the slit and the pinhole highly precisely. In actual practice, however, such a task has been difficult.

The present disclosure has been made in consideration of such a point, and the object of the present disclosure is to provide a laser processing device with which the focal position of a laser beam can be checked highly precisely using a simple and inexpensive structure, and a method for adjusting the focal position of a laser beam using the laser processing device.

Solutions to Problem

In order to achieve the object described above, a laser processing device according to the present disclosure is characterized by including: a laser oscillator that generates at least a laser beam; a laser head that irradiates a workpiece with the laser beam; and an articulated robot on which the laser head is mounted, in which the articulated robot includes: a robot arm; an arm tip shaft that is rotatable about a predetermined axis and provided at a tip of the robot arm; and a connector component that connects the arm tip shaft and the laser head, wherein the connector component has a gauge attachment portion to which a gauge is attached removably, and the gauge has a reference point corresponding to a focal position of the laser beam.

A method for adjusting a focal position of a laser beam according to the present disclosure is a method for adjusting a focal position of a laser beam using the laser processing device, the method including; a first step of attaching the gauge to the connector component that is mounted on the arm tip shaft; a second step of causing the laser head to emit a guide laser beam after the first step; and a third step of determining whether a distance between a position irradiated with the guide laser beam on the gauge and the reference point is within a predetermined range while the second step is being performed, in which, when a determination result in the third step is negative, a position of the laser head with respect to the arm tip shaft is adjusted, and a process goes back to the first step and a series of the first step to the third step is repeated until the determination result in the third step becomes positive.

Advantageous Effect of Invention

According to the present disclosure, it is possible to check the focal position of the laser beam highly precisely using a simple and inexpensive structure.

BRIEF DESCRIPTION OF THE DRAWINGS

FIG. 1 is a schematic configuration diagram of a laser processing device according to an exemplary embodiment.

FIG. 6C is a schematic diagram of an example in which the distance between the position irradiated with the guide laser beam and the reference point on the gauge is within a predetermined range.

DESCRIPTION OF EMBODIMENT

Figure 2:
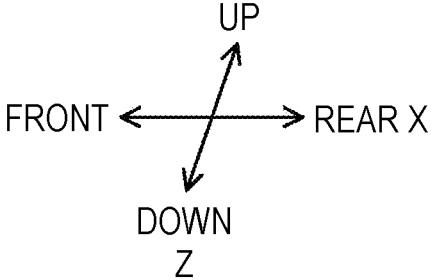
FIG. 2 is an enlarged view of relevant parts of a manipulator.

Exemplary embodiments of the present disclosure will now be explained with reference to the drawings. The following descriptions of preferable exemplary embodiments are merely illustrative in nature, and are not intended to limit the scope, applications, or use of the present disclosure in any way.

First Exemplary Embodiment

[Configuration of Laser Processing Device]

Figure 1:
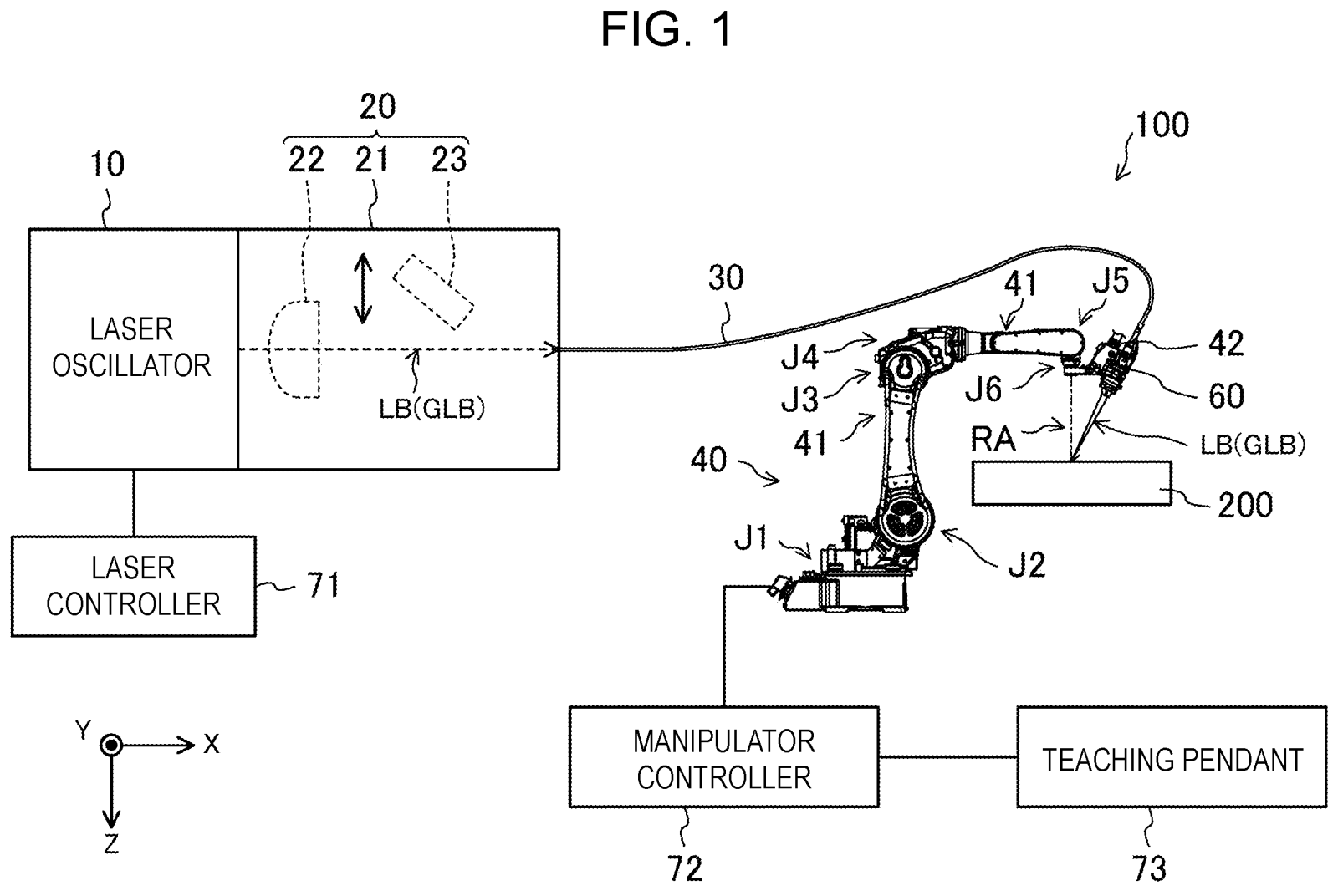

FIG. 1 is a schematic configuration diagram of a laser processing device according to the present exemplary embodiment. In the following description, the direction in which laser beam LB travels inside optical unit 20 is sometimes referred to as an X direction, and a direction intersecting with the X direction on a surface of workpiece 200 illustrated in FIG. 1 is sometimes referred to as a Y direction. A direction intersecting with both of the X direction and the Y direction is sometimes referred to as a Z direction. In addition, with manipulator 40 in a stationary condition in the posture illustrated in FIG. 1, the side on which laser head 60 is positioned in the Z direction may be referred to as an upward or an upper side, and the side on which workpiece 200 is positioned may be referred to as a downward or a lower side. Furthermore, with manipulator 40 in the same condition, the side on which laser head 60 is positioned in the X direction is sometimes referred to as forward or a front side, and the side on which robot arm 41 is positioned is sometimes referred to as rearward or a rear side.

As illustrated in FIG. 1, laser processing device 100 includes laser oscillator 10, optical unit 20, manipulator 40, optical fiber 30, and laser head 60. Laser processing device 100 also includes laser controller 71, manipulator controller 72, and teaching pendant 73.

Laser oscillator 10 generates laser beam LB, and emits laser beam LB toward optical unit 20. In the present exemplary embodiment, laser beam LB has a wavelength of approximately 900 nm to 1000 nm, and an output of approximately 1 kW to 5 kW. However, the present disclosure is not limited to these particular values, and the wavelength and the output may take different values. Laser oscillator 10 also includes another laser beam source (not illustrated), and guide laser beam GLB is emitted from the other laser beam source. Guide laser beam GLB has a wavelength of approximately 650 nm and an output of approximately several mW to several tens of mW. The optical axis of guide laser beam GLB is substantially in alignment with the optical axis of laser beam LB.

In the description herein, the phrase "substantially in alignment with" or "substantially orthogonal to" means that objects being compared are matched with each other or orthogonal to each other, with the machining tolerance and the assembly tolerance of the components of laser processing device 100 included. These phrases do not mean that the objects being compared are matched with or orthogonal to each other in a strict sense.

Optical unit 20 includes housing 21 in which condenser lens 22 and shutter 23 are provided. Condenser lens 22 condenses incident laser beam LB inside housing 21, and outputs the laser beam to optical fiber 30. Shutter 23 is provided in a manner movable into and out of the optical path of laser beam LB, and controls an incident state of laser beam LB on optical fiber 30 by its opening and closing operation. Optical unit 20 may also include condensing position adjustment mechanism, not illustrated, in order to match the position where laser beam LB is condensed to an end face of optical fiber 30 where the laser beam becomes incident.

Manipulator 40 is a known vertical six-axis robot having first to sixth joint shafts J1 to J6. In the following description, sixth joint shaft J6 may be referred to as arm tip shaft J6. Arm tip shaft J6 is provided at the tip of robot arm 41. Arm tip shaft J6 is configured rotatably about predetermined axis RA (see FIGS. 1 and 2). Note that elements such as a cooling hose (not illustrated) for laser head 60 and an I/O line (not illustrated) for a thermal switch are accommodated inside of cable 42.

Optical fiber 30 is connected to optical unit 20 and to laser head 60, and transmits incident laser beam LB from optical unit 20 to laser head 60. Although not illustrated, optical fiber 30 has one or a plurality of cores serving as waveguides for laser beam LB.

Laser head 60 is mounted on manipulator 40, specifically, on arm tip shaft J6 by connector component 50. Laser head 60 irradiates workpiece 200 with laser beam LB having been transmitted from optical fiber 30 to laser head 60, and workpiece 200 is laser-processed thereby. An optical system, not illustrated, such as a collimator lens and a condenser lens are provided inside laser head 60, and converts laser beam LB into parallel light, and then condenses laser beam LB on the surface of workpiece 200.

As arm tip shaft J6 is rotated, laser head 60 is rotated together and moved along a circumference of a circle having a radius corresponding to the length of connector component 50. However, a positioning relationship among laser head 60, arm tip shaft J6, and connector component 50 that connects laser head 60 and arm tip shaft J6 is established in such a manner that the focal position of laser beam LB emitted from laser head 60 is not moved by the rotation of laser head 60. In other words, the positional relationship among laser head 60, arm tip shaft J6, and connector component 50 that connects laser head 60 and arm tip shaft J6 is established in such a manner that the focal position of laser beam LB is at a point on axis RA that is the rotational axis of arm tip shaft J6. In this manner, when manipulator 40 makes a pivoting operation, for example, accuracy of operation is improved. In other words, the focal position of laser beam LB does not move while workpiece 200 is laser-processed by rotating arm tip shaft J6. Therefore, laser processing can be applied to an intended processing point, appropriately.

Laser controller 71 is electrically connected to laser oscillator 10, and controls an operation of laser oscillator 10. Laser controller 71 also controls an operation of a power supply (not illustrated) that is connected to laser oscillator 10. Specifically, laser oscillator 10 controls an output and oscillation time of laser beam LB, and timings at which oscillations of laser beam LB and guide laser beam GLB are started and stopped.

Manipulator controller 72 is electrically connected to manipulator 40, and controls an operation of manipulator 40. Specifically, manipulator controller 72 controls the speed and the amount by which laser head 60 connected to manipulator 40 is moved, by controlling the speeds and the amounts at and by which respective motors (not illustrated) connected to respective first to sixth joint shafts J1 to J6 are rotated.

Manipulator controller 72 controls the operation of manipulator 40 based on an operation program prepared in advance, or based on parameters input from teaching pendant 73. Manipulator controller 72 also sets and stores therein the focal position of laser beam LB emitted from laser head 60.

Teaching pendant 73 is a device used for causing manipulator controller 72 to store predetermined operations. Using teaching pendant 73, an operator makes actual operations of manipulator 40, and causes manipulator controller 72 to store various parameters. Examples of the parameters include the amount by which the motors (not illustrated) connected to respective first to sixth joint shafts J1 to J6 are rotated, respectively, from one teaching point to the next teaching point. Teaching pendant 73 is also used to cause manipulator 40 to make the operation stored in the manipulator controller 72 again, and to make fine adjustment of the various parameters and to store the parameters in manipulator controller 72 again, as required.

[Configurations of Manipulator and Gauge]

Figure 3:
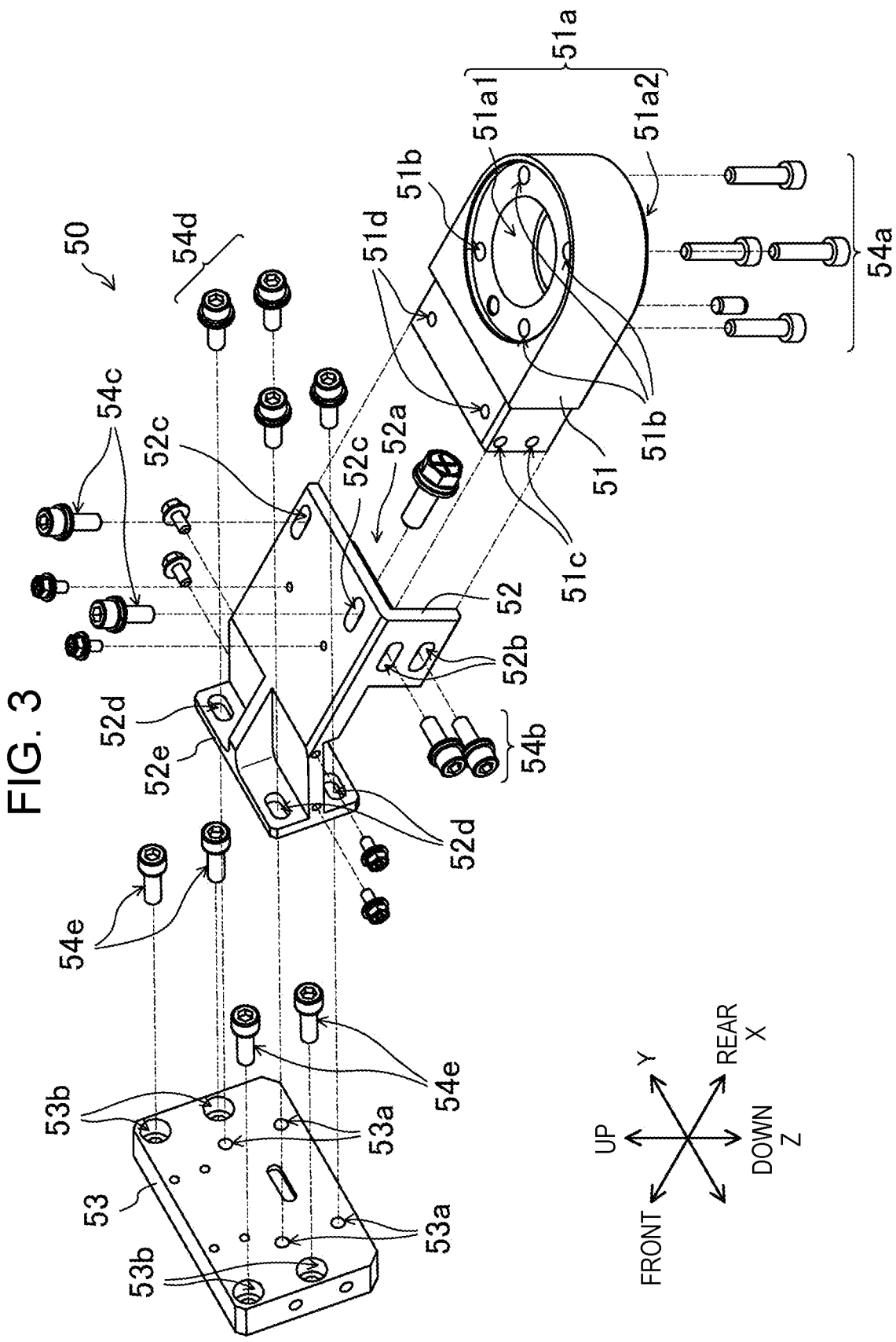
FIG. 3 is an exploded perspective view of a connector component connecting a laser head and an arm tip shaft.
Figure 4A:
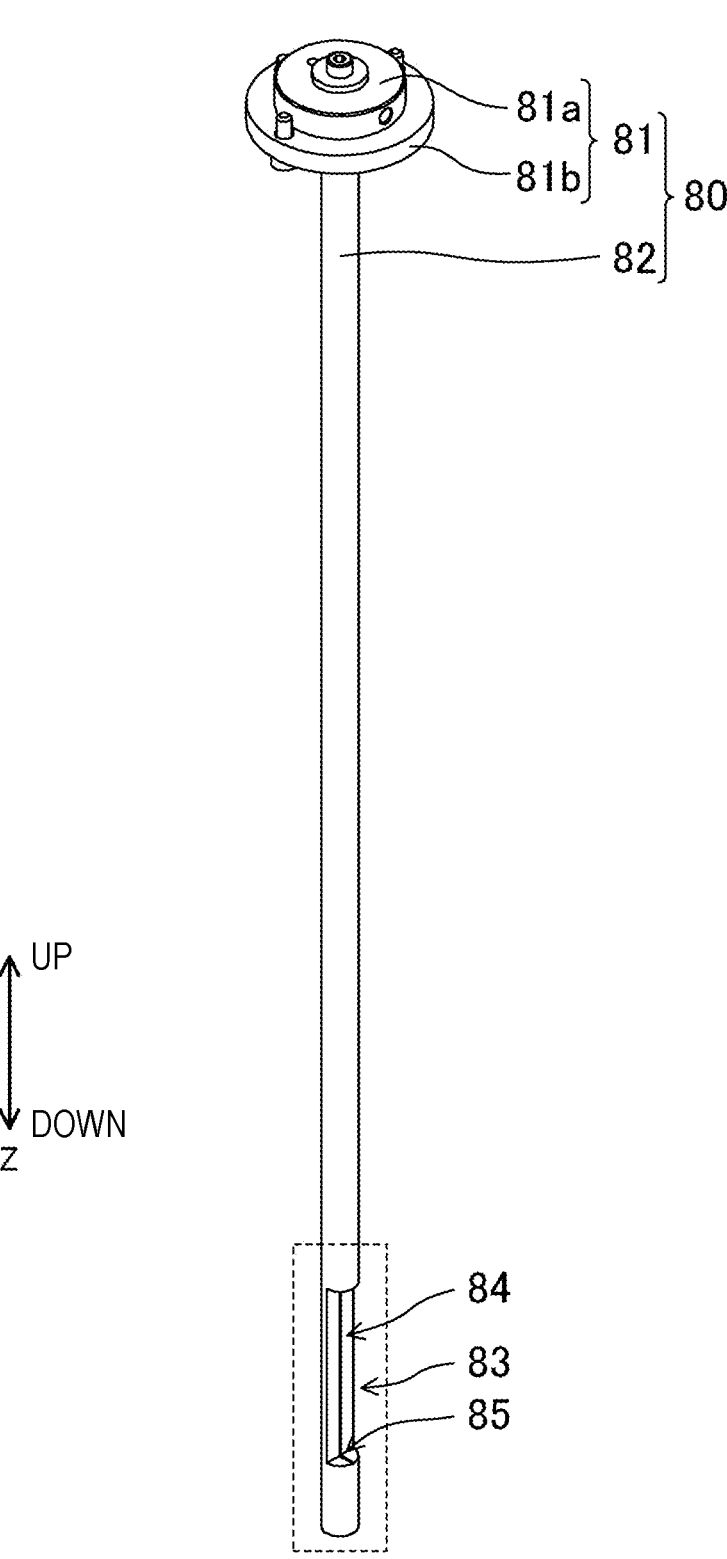
FIG. 4A is a perspective view of a gauge.
Figure 4B:
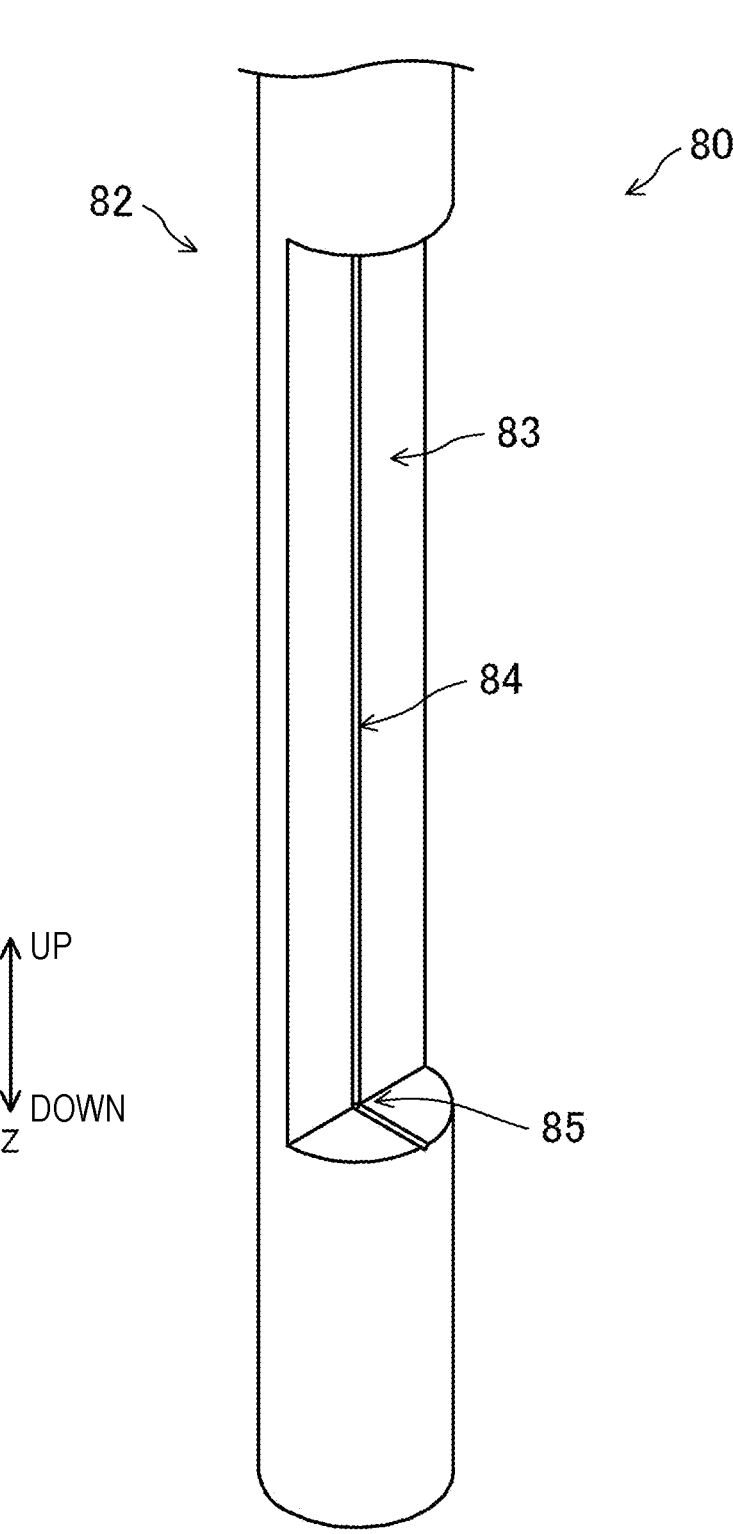
FIG. 4B is an enlarged view of a part surrounded by the broken line in FIG. 4A.

FIG. 2 is an enlarged view of relevant parts of the manipulator, and FIG. 3 is an exploded perspective view of the connector component connecting the laser head and the arm tip shaft. FIG. 4A illustrates a perspective view of the gauge, and FIG. 4B illustrates an enlarged view of the portion surrounded by the dashed line in FIG. 4A. FIG. 2 illustrates a configuration before gauge 80 is attached to gauge attachment portion 51*a*.

As illustrated in FIG. 2, laser head 60 is mounted on arm tip shaft J6 via connector component 50. As illustrated in FIG. 3, connector component 50 includes first to third components 51 to 53.

As illustrated in FIG. 2, first component 51 has gauge attachment portion 51*a*. Gauge attachment portion 51*a* includes flat surface 51*a*2 of first component 51 and through-hole 51*a*1 that penetrates first component 51 in the Z direction in FIG. 2. Axis RA that is the rotational axis of arm tip shaft J6 is an imaginary line passing through the center of through-hole 51*a*1, and that is substantially orthogonal to flat surface 51*a*2. As illustrated in FIG. 2, gauge 80 is attached to a lower portion of through-hole 51*a*1. Arm tip shaft J6 is attached to an upper portion of through-hole 51*a*1.

As illustrated in FIG. 3, first component 51 has a plurality of first bolt holes 51*b* in a manner surrounding through-hole 51*a*1. First bolts 54*a* are inserted into respective first bolt holes 51*b*. By fastening first bolts 54*a*, first component 51 is attached and fixed to arm tip shaft J6.

Second component 52 has recess 52*a* provided on the rear side in the X direction. Second component 52 also has mount portion 52*e*, on the front side in the X direction. Mount portion 52*e* has a quadrangular shape in a view from the front side.

Second component 52 also has first to third alignment holes 52*b* to 52*d*. There are two first alignment holes 52*b* on a side surface of second component 52, with a space therebetween in the Z direction. The inner diameter of first alignment holes 52*b* is longer in the X direction than in the Z direction. There are two second alignment holes 52*c* in an upper surface of second component 52, with a space therebetween in the Y direction. The inner diameter of second alignment holes 52*c* is longer in the X direction than in the Y direction. Third alignment holes 52*d* are provided at four respective corners of mount portion 52*e* of second component 52. The inner diameter of third alignment holes 52*d* is longer in the Y direction than in the Z direction.

First component 51 has second bolt holes 51*c* and third bolt holes 51*d* at positions corresponding to first alignment holes 52*b* and second alignment holes 52*c*, respectively, provided to second component 52. Third component 53 is a plate-shaped component, and is attached to a side surface of laser head 60. Third component 53 has fourth bolt holes 53*a* at positions corresponding to third alignment holes 52*d*, respectively, provided to second component 52. Third component 53 has a plurality of fifth bolt holes 53*b*. Fifth bolts

54*e* are inserted into fifth bolt holes 53*b*, respectively. By fastening fifth bolts 54*e*, third component 53 is attached and fixed to laser head 60.

At the positions assembled into connector component 50, a front part of first component 51 is accommodated inside recess 52*a* of second component 52. Mount portion 52*e* of second component 52 abuts on a surface of third component 53. In addition, second bolts 54*b* are inserted into first alignment holes 52*b* and second bolt holes 51*c*, respectively, and third bolts 54*c* are inserted into second alignment holes 52*c* and third bolt holes 51*d*, respectively. Second bolts 54*b* and third bolts 54*c* are then fastened, so that the second component 52 is attached to first component 51 thereby. Fourth bolts 54*d* are inserted into third alignment holes 52*d* and fourth bolt holes 53*a*. Fourth bolts 54*d* are then fastened respectively, so that second component 52 is attached to third component 53 thereby.

The positional relationship between first component 51 and second component 52 is adjusted by positioning of second bolts 54*b* inserted into first alignment holes 52*b*, respectively, and third bolts 54*c* inserted into second alignment holes 52*c*, respectively. For example, to shift second component 52 forwards in the X direction with respect to first component 51, second bolts 54*b* and third bolts 54*c* are inserted, into first alignment holes 52*b* and second alignment holes 52*c*, respectively, on the front side with respect to a center in the X direction. By then fastening second bolts 54*b* and third bolts 54*c* at these respective positions, second component 52 is attached to first component 51. Similarly, the positional relationship between second component 52 and third component 53 is adjusted using the positions of the fourth bolts 54*d* inserted into third alignment holes 52*d*, respectively. For example, to shift second component 52 to one side in the Y direction with respect to third component 53, fourth bolts 54*d* are inserted into third alignment holes 52*d*, respectively, on the one side with respect to the center in the Y direction. By fastening fourth bolts 54*d* at these respective positions, second component 52 is attached to third component 53.

Gauge 80 is a member for checking the focal position of laser beam LB. As illustrated in FIG. 4A, gauge 80 is configured by head 81 and leg 82 extending linearly from head 81. Head 81 is configured by protrusion 81*a*, and flange 81*b* surrounding protrusion 81*a*. With protrusion 81*a* accommodated inside through-hole 51*a*1, and an upper surface of flange 81*b* abutting on flat surface 51*a*2 of first component 51, flange 81*b* is fixed to first component 51 with screws. Gauge 80 can be easily removed from gauge attachment portion 51*a* by removing the screws from flange 81*b* and first component 51. In other words, gauge 80 is removably attached to gauge attachment portion 51*a*.

As illustrated in FIG. 4B, leg 82 is a columnar member having cutout 83 in an intermediate portion thereof in the Z direction. Center line 84 extending in the Z direction is provided at the center of cutout 83. In the present exemplary embodiment, center line 84 is a scribed line formed by scribing the surface of cutout 83. With gauge 80 attached to gauge attachment portion 51*a*, center line 84 provided on cutout 83 is substantially in alignment with axis RA. In this configuration, gauge 80 is placed at a position intersecting with the optical path of laser beam LB emitted from laser head 60. An intersection between the bottom end of cutout 83 in the Z direction and center line 84 of cutout 83 serves as reference point 85 corresponding to the focal position of laser beam LB.

The focal position of laser beam LB is adjusted by attaching gauge 80 to connector component 50, as will be described later. In addition, it is needless to say that, during the ordinary laser processing, gauge 80 is removed from gauge attachment portion 51*a*.

[Sequence for Focal Position Adjustment of Laser Beam]

Figure 5:
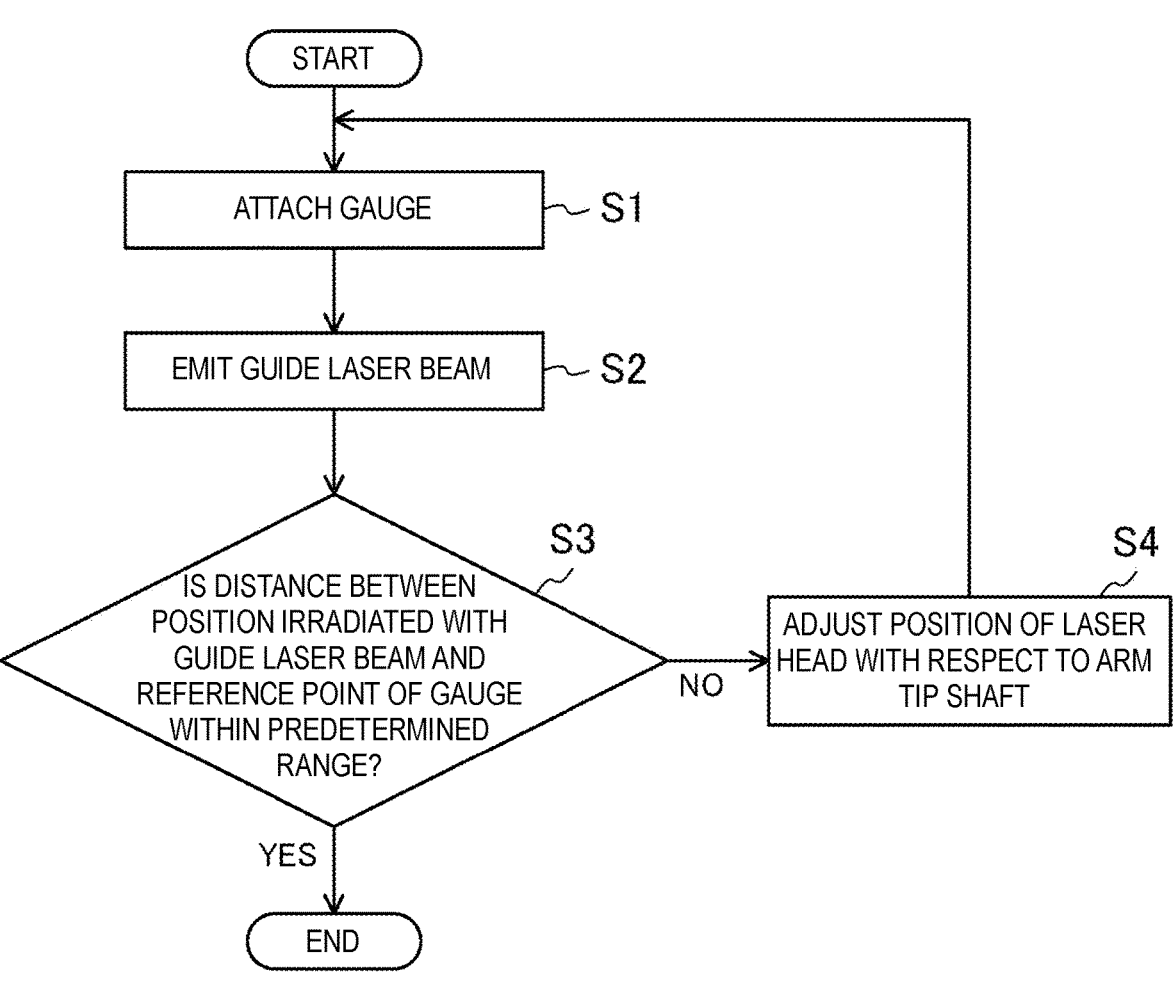
FIG. 5 is a flowchart illustrating a sequence for adjusting the focal position of a laser beam.
Figure 6A:
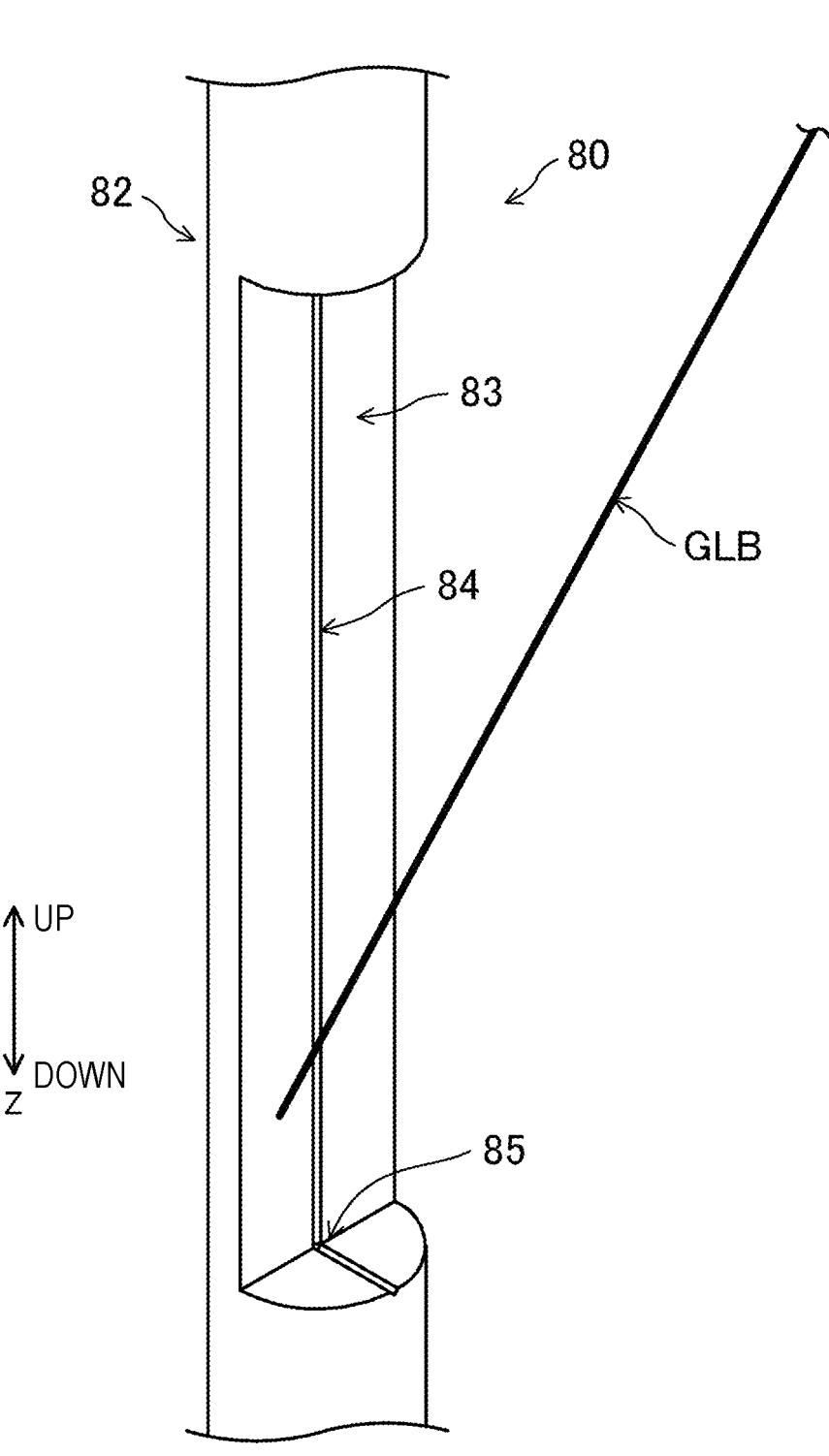
FIG. 6A is a schematic diagram of an example in which the distance between the position irradiated with a guide laser beam and a reference point on a gauge is outside a predetermined range.
Figure 6B:
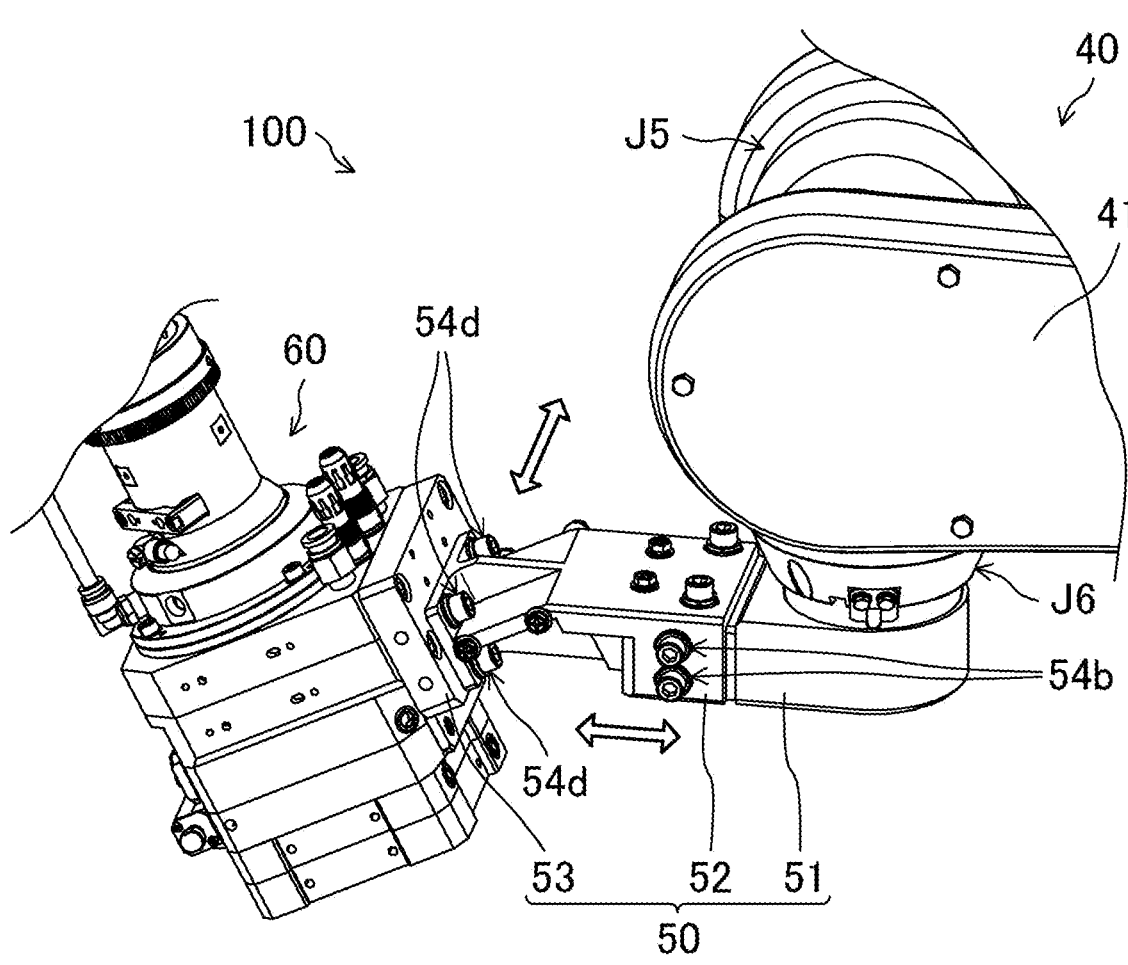
FIG. 6B is a schematic diagram illustrating a sequence for adjusting the position of the laser head with respect to the arm tip shaft.
Figure 6B:
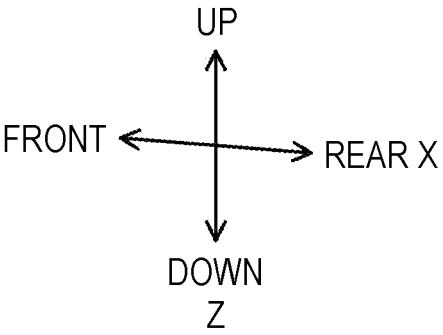
Figure 6C:
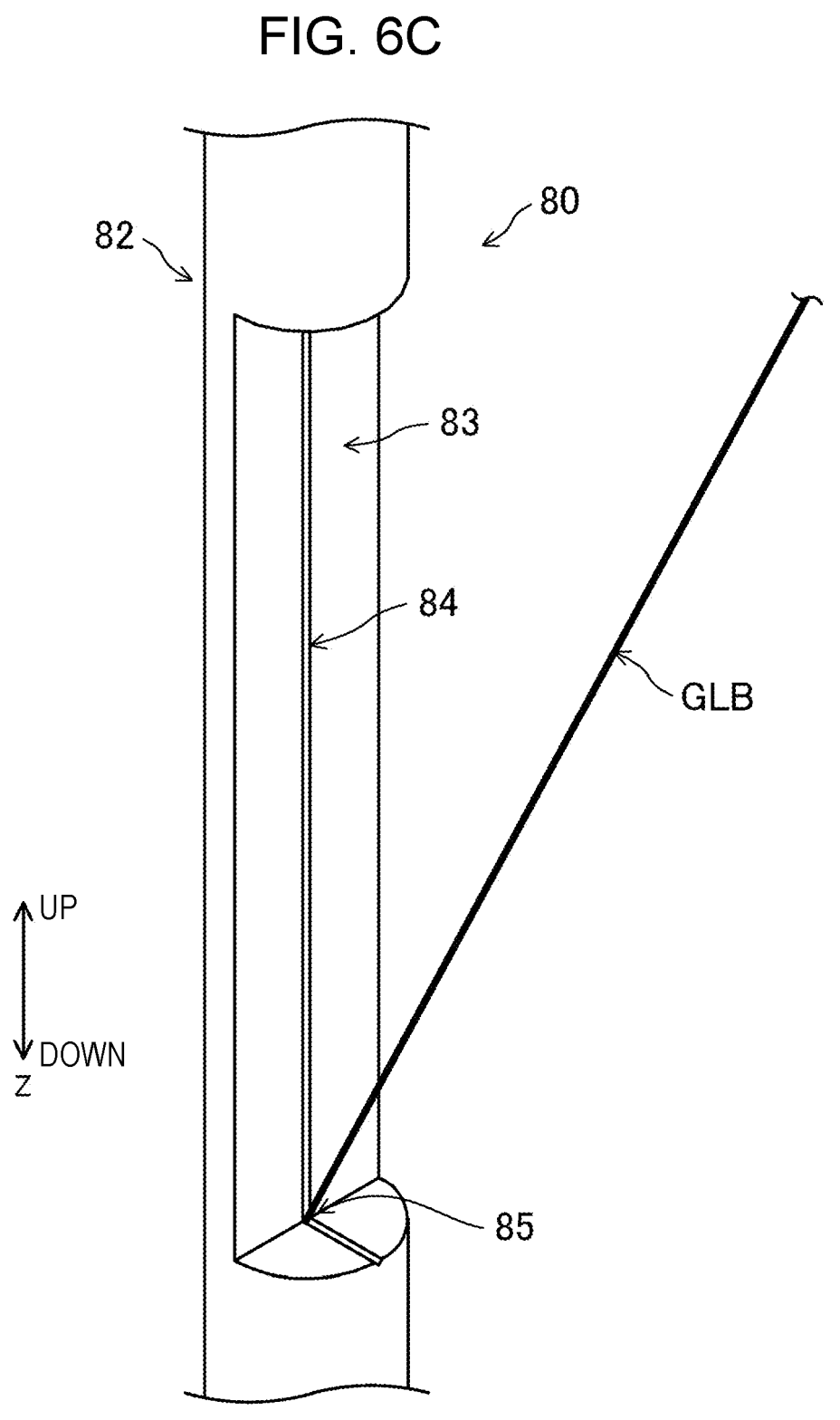

FIG. 5 is a flowchart of a sequence for adjusting the focal position of a laser beam. FIG. 6A is a schematic diagram of an example in which the distance between the position irradiated with the guide laser beam and the reference point of the gauge is outside of a predetermined range. FIG. 6B is a schematic diagram of a sequence for adjusting the position of the laser head with respect to the arm tip shaft. FIG. 6C is a schematic diagram of an example in which the distance between the position irradiated with the guide laser beam and the reference point of the gauge is within the predetermined range.

Workpiece 200 can be laser-processed as intended by causing manipulator 40 to move laser head 60 in a predetermined trajectory, while emitting laser beam LB from laser head 60. At this time, the focal position of laser beam LB needs to be on or near the surface of workpiece 200 to be processed.

However, after laser head 60 has been removed from and mounted on manipulator 40 again for a purpose such as maintenance, there might be a deviation in the position of laser head 60, with respect to arm tip shaft J6 of manipulator 40. Such a positional deviation may cause the focal position of laser beam LB to deviate from the position thereof set in manipulator controller 72. When such a deviation occurs, a weld bead width, a hole diameter in the case of drilling, a cutting width in the case of cutting, or the like may deviate from a desirable range, and the processing may end up being defective.

Therefore, when laser head 60 has been removed from manipulator 40, or when other tasks such as maintenance have been performed, it is necessary to check whether the focal position of laser beam LB is at an intended position. If the focal position of laser beam LB has deviated from the position set in manipulator controller 72, it is necessary to make an adjustment for bringing the focal position of laser beam LB back to the original position. It is also necessary to check the focal position of laser beam LB and to make an adjustment, if required, in the manner explained in the present exemplary embodiment, when parameter settings of an operation program of manipulator 40 are reconfigured using teaching pendant 73, subsequently to a maintenance of laser processing device 100.

In the present exemplary embodiment, by attaching gauge 80 to gauge attachment portion 51*a* and checking the position irradiated with guide laser beam GLB with respect to reference point 85, the focal position of laser beam LB is checked and adjusted, as required. A further description will now be given with reference to FIGS. 5 and 6A to 6C.

As illustrated in FIG. 5, before checking the focal position of laser beam LB, gauge 80 is attached to gauge attachment portion 51*a* of first component 51 (step S1 (first step)). In this state, laser oscillator 10 is caused to generate guide laser beam GLB, and the laser beam is transmitted via optical unit 20 and optical fiber 30 to laser head 60. Guide laser beam GLB thus transmitted is emitted to the outside of laser head 60. The optical path of guide laser beam GLB is substantially in alignment with the optical path of laser beam LB. Therefore, it can be said that gauge 80 is at a position intersecting with the optical path of guide laser beam GLB emitted from laser head 60. In other words, gauge 80 is irradiated with guide laser beam GLB (step S2 (second step)).

Reference point 85 of gauge 80 is designed to be irradiated with guide laser beam GLB when the focal position of laser beam LB is at a position set by manipulator controller 72.

Therefore, while step S2 is being performed, it is determined whether reference point 85 is irradiated with guide laser beam GLB. More specifically, it is determined whether the distance between the position irradiated with guide laser beam GLB and reference point 85 on gauge 80 is within a predetermined range (step S3 (third step)).

If the determination result in the third step is positive, that is, if the distance between the position irradiated with guide laser beam GLB and reference point 85 on gauge 80 is within the predetermined range (see FIG. 6C), it is determined that the focal position of laser beam LB is at the position set in manipulator controller 72, and the operation is ended.

By contrast, if the determination result in the third step is negative, that is, if the distance between the position irradiated with guide laser beam GLB and reference point 85 on gauge 80 is outside the predetermined range, that is, if the distance is as illustrated in FIG. 6A, it is determined that the focal position of the laser beam LB has deviated from the position set in manipulator controller 72. In such a case, the focal position of laser beam LB is corrected by adjusting the position of laser head 60 with respect to arm tip shaft J6 (step S4 (fourth step)). Specifically, gauge 80 is removed from arm tip shaft J6. The focal position of laser beam LB is also corrected by adjusting the positional relationship among first to third components 51 to 53 of connector component 50. Specifically, as described earlier, by adjusting the positions at which second to fourth bolts 54*b* to 54*d* are inserted in first to third alignment holes 52*b* to 52*d* of second component 52, respectively, the positional relationship among first to third components 51 to 53, and the position of laser head 60 with respect to arm tip shaft J6 are adjusted, as illustrated in FIG. 6B.

After step S4 is completed, the process goes back to step S1, and a series of steps is repeated until the determination result becomes positive in the third step.

Needlessly to say, it is preferable if the distance between the position irradiated with guide laser beam GLB and reference point 85 on gauge 80 is zero. However, when condenser lens 22 or the optical system inside laser head 60 has chromatic aberration, or when the optical path of laser beam LB is out of alignment with the optical path of guide laser beam GLB, the distance between the position irradiated with guide laser beam GLB and reference point 85 on gauge 80 does not become zero, and the predetermined range can be a finite value. Note that the predetermined range is determined as appropriate, depending on factors such as a laser processing method and specifications laser processing device 100 is required to satisfy.

Effects and the Like

As described above, laser processing device 100 according to the present exemplary embodiment includes: laser oscillator 10 that generates at least laser beam LB; laser head 60 that irradiates workpiece 200 with laser beam LB; and manipulator (multi-joint robot) 40 on which laser head 60 is mounted.

Manipulator 40 includes: robot arm 41; arm tip shaft J6 provided at a tip of robot arm 41 in a manner rotatable about predetermined axis RA; and connector component 50 that connects arm tip shaft J6 and laser head 60.

Connector component 50 has gauge attachment portion 51a for removably attaching gauge 80. Gauge 80 has reference point 85 corresponding to the focal position of laser beam LB.

According to the present exemplary embodiment, the focal position of laser beam LB can be checked precisely using a simple and inexpensive structure. Furthermore, in situations in which the optical axis of laser LB moves, e.g., on the replacement of laser oscillator 10, optical fiber 30, or laser head 60, it is not necessary to modify the operation program of manipulator 40.

Connector component 50 includes first to third components 51 to 53, and first component 51 is attached to arm tip shaft J6. Furthermore, gauge attachment portion 51a is provided to first component 51.

Laser processing device 100 is configured to be enabled to adjust the focal position of laser beam LB by adjusting a positional relationship among first to third components 51 to 53 of connector component 50.

According to the present exemplary embodiment, the focal position of laser beam LB can be adjusted precisely using a simple and inexpensive structure.

With gauge 80 is attached to gauge attachment portion 51a, center line 84 extending in the longitudinal direction of gauge 80 is substantially in alignment with axis RA that is the rotational axis of arm tip shaft J6. In addition, reference point 85 is provided on center line 84.

In this manner, the focal position of laser beam LB can be checked easily and inexpensively.

Gauge 80 is a columnar member having cutout 83 at an intermediate portion in the Z direction that is the longitudinal direction. The intersection between the lower end of cutout 83 and center line 84 of cutout 83 extending in the Z direction serves as reference point 85.

In this manner, when gauge 80 is irradiated with guide laser beam GLB, it is possible to determine whether reference point 85 is irradiated with guide laser beam GLB, reliably.

Usually, in determining whether reference point 85 is irradiated with guide laser beam GLB, the operator wearing a protector visually makes the determination, or a camera is caused to measure the distance between reference point 85 and the position irradiated with guide laser beam GLB on gauge 80.

When reference point 85 is planarly displayed, e.g., when reference point 85 is displayed as an image on a plane extending parallel with axis RA, it may be difficult to determine whether reference point 85 is irradiated with guide laser beam GLB, depending on the intensity of guide laser beam GLB and the camera sensitivity.

By contrast, by using the intersection as reference point 85, when reference point 85 is irradiated with guide laser beam GLB, guide laser beam GLB scatters, and the reflected light spreads. When guide laser beam GLB deviates from reference point 85 and hits a portion below cutout 83, among the areas of cutout 83 and leg 82, guide laser beam GLB scatters less, so that the reflected light spreads less.

In this manner, by also evaluating the degree how much the reflected light of guide laser beam GLB spreads, it is possible to determine whether reference point 85 is irradiated with guide laser beam GLB reliably and accurately.

The method for adjusting the focal position of laser beam LB according to the present exemplary embodiment includes step S1 (first step) of attaching gauge 80 to connector component 50 attached to arm tip shaft J6, and step S2 (second step) of causing laser head 60 to emit guide laser beam GLB after step S1.

The method also includes step S3 (third step) of determining whether a distance between the position irradiated with guide laser beam GLB and reference point 85 on gauge 80 is within a predetermined range while step S2 is being executed.

If the determination result in step S3 is negative, the position of laser head 60 with respect to arm tip shaft J6 is adjusted (step S4), and the process goes back to step S1. A series of steps is then repeated until the determination result in step S3 becomes positive.

According to the present exemplary embodiment, the focal position of laser beam LB can be adjusted simply and inexpensively.

Furthermore, by adjusting the positional relationship among first to third components 51 to 53 included in connector component 50, the focal position of laser beam LB can be adjusted precisely.

Furthermore, in situations in which the optical axis of laser LB is moved, e.g., when the laser oscillator 10, optical fiber 30, or laser head 60 is replaced, it is not necessary to modify the operation program of manipulator 40. Therefore, the time required for the maintenance of laser processing device 100 can be reduced. In addition, an increase in maintenance cost can be suppressed.

Other Exemplary Embodiments

Figure 7A:
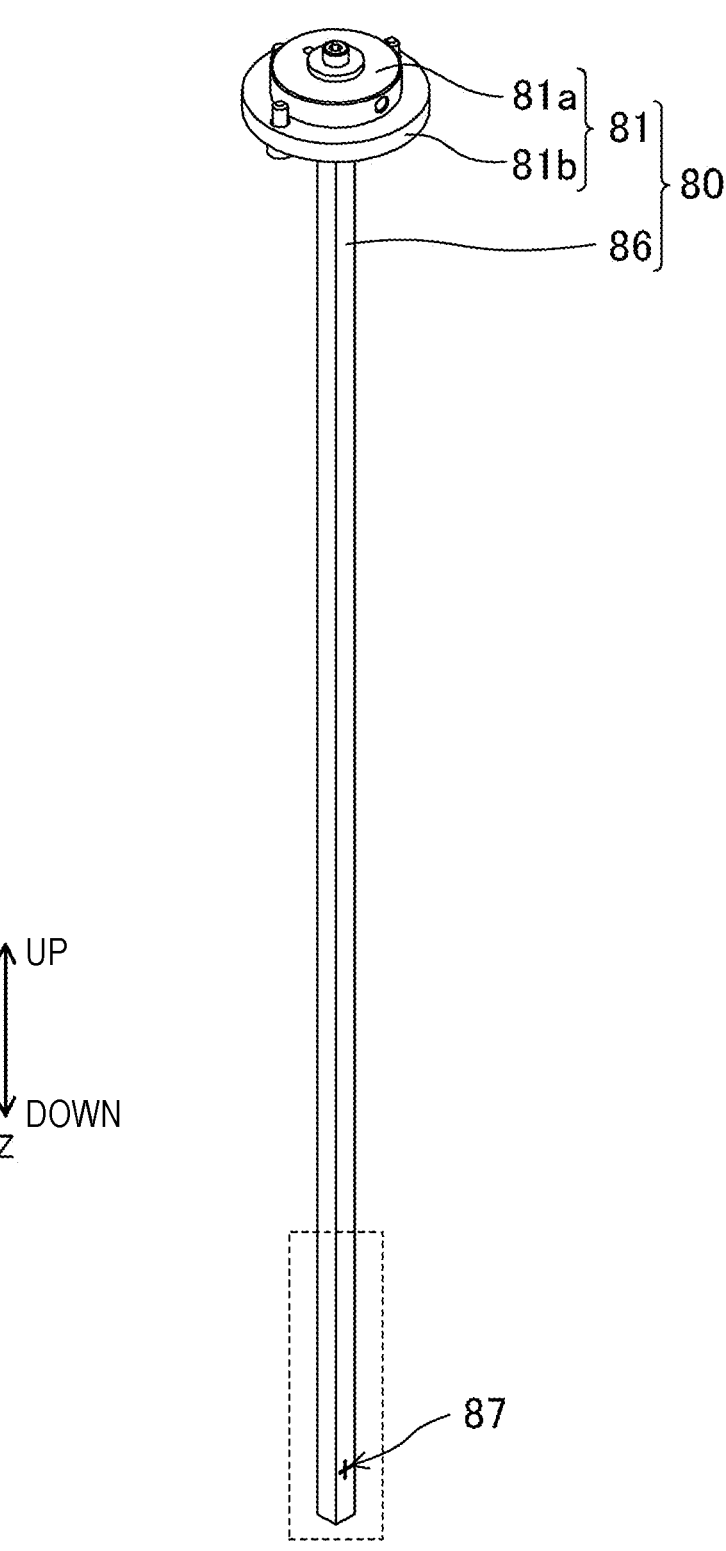
FIG. 7A is a perspective view of another gauge.
Figure 7B:
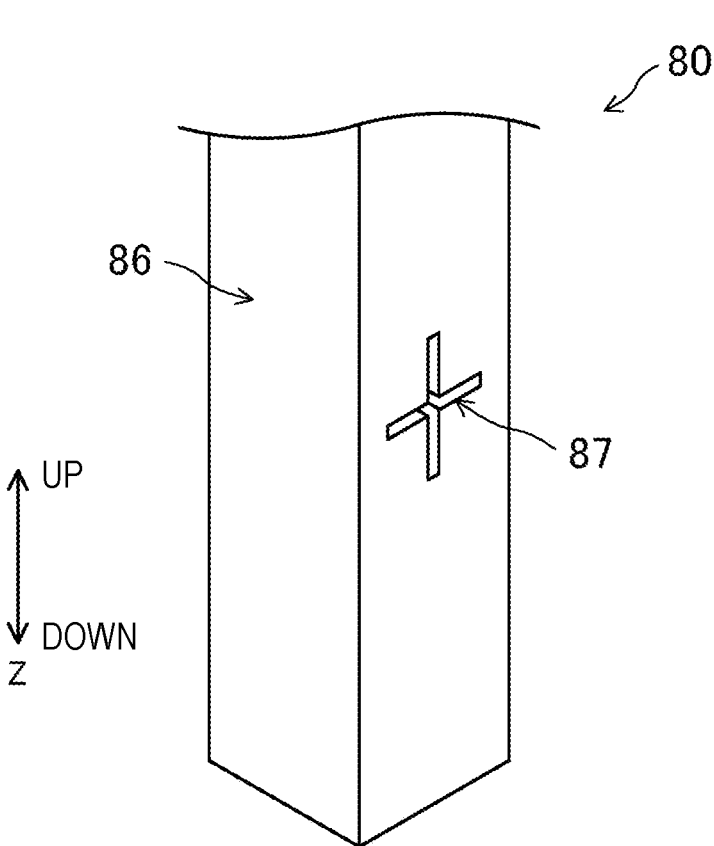
FIG. 7B is an enlarged view of the part surrounded by the broken line in FIG. 7A.

In the explanation of the exemplary embodiment, gauge 80 illustrated in FIGS. 4A and 4B is used as an example. However, the shape of gauge 80 is not limited to this particular shape. For example, as illustrated in FIGS. 7A and 7B, leg 86 of gauge 80 may have a prismatic column-like shape. In addition, reference point 87 may have a cross shape provided on a side surface of leg 86. As illustrated in FIG. 7B, reference point 87 preferably recesses inward or protrudes outward from the side surface of leg 86. In this manner, when reference point 87 is irradiated with guide laser beam GLB, it is possible to determine whether reference point 87 is irradiated with guide laser beam GLB reliably and precisely, by also evaluating the degree how much the reflected light of guide laser beam GLB spreads.

The shape of the reference point is not limited to the example illustrated in FIGS. 4B and 7B. For example, gauge 80 may be provided with a plurality of recesses or protrusions, and an intersection of the recesses or the protrusions may be used as reference point 87.

In addition, explained in the exemplary embodiment is an example in which connector component 50 includes first to third components 51 to 53, but the present exemplary embodiment is not limited to this particular configuration. For example, third component 53 may be omitted, and second component 52 may be directly attached to laser head 60. Connector component 50 may include another component other than first to third components 51 to 53.

In addition, explained in the exemplary embodiment is an example in which manipulator 40 is a robot having the six joint shafts J1 to J6, but the present exemplary embodiment is not limited to this particular configuration. For example, manipulator 40 may be an articulated robot having three or more joint shafts. Also in such an example, the arm tip shaft is provided at the tip of robot arm 41 in a manner rotatable about a predetermined axis.

Explained in the exemplary embodiment is the example in which laser oscillator 10 includes the laser beam source that generates guide laser beam GLB, but the laser beam source may be provided separately from laser oscillator 10. It is sufficient if the optical axis of guide laser beam GLB being incident on optical fiber 30 is substantially is alignment with the optical axis of the laser beam LB.

INDUSTRIAL APPLICABILITY

The laser processing device according to the present disclosure is useful because the focal position of the laser beam can be checked precisely using a simple and inexpensive structure.

REFERENCE MARKS IN THE DRAWINGS

10: laser oscillator
20: optical unit
21: housing
22: condenser lens
23: shutter
30: optical fiber
40: manipulator
41: robot arm
42: cable
50: connector component
51: first component
51*a*: gauge attachment portion
51*a2*: flat surface
51*a1*: through-hole
51*b*: first bolt hole
51*c*: second bolt hole
51*d*: third bolt hole
52: second component
52*b*: first alignment hole
52*c*: second alignment hole
52*d*: third alignment hole
52*e*: mount portion
53: third component
53*a*: fourth bolt hole
53*b*: fifth bolt hole
54*a* to 54*e*: first to fifth bolts
60: laser head
71: laser controller
72: manipulator controller
73: teaching pendant
80: gauge
81: head
81*a*: protrusion
81*b*: flange
82, 86: leg
83: cutout
84: center line
85, 87: reference point
100: laser processing device
200: workpiece
J1 to J5: first to fifth joint shafts
J6: sixth joint shaft (arm tip shaft)
LB: laser beam
GLB: guide laser beam

The invention claimed is:

1. A laser processing device comprising:
a laser oscillator that generates at least a laser beam;
a laser head that irradiates a workpiece with the laser beam; and
an articulated robot on which the laser head is mounted,
wherein the articulated robot includes
a robot arm,
an arm tip shaft that is rotatable about a predetermined axis and provided at a tip of the robot arm, and a connector component that connects the arm tip shaft and the laser head,
the connector component has a gauge attachment portion to which a gauge is attached removably, and
the gauge is a pillar-shaped member having a reference point corresponding to a focal position of the laser beam, the reference point being formed on a surface of the gauge.

2. The laser processing device according to claim 1, wherein
the gauge has a plurality of recesses or protrusions, and
the plurality of recesses or protrusions have an intersection serving as the reference point.

3. The laser processing device according to claim 1, wherein
the connector component includes a first component and a second component,
the first component is attached to the arm tip shaft, and
the gauge attachment portion is provided to the first component.

4. The laser processing device according to claim 3, wherein the focal position of the laser beam is adjustable by adjusting a positional relationship between the first component and the second component included in the connector component.

5. The laser processing device according to claim 1, wherein
a center line formed on a surface of the gauge and extending in a longitudinal direction of the gauge is substantially in alignment with the predetermined axis in a configuration in which the gauge is attached to the gauge attachment portion, and
the reference point is provided on the center line.

6. A method for adjusting a focal position of a laser beam using a laser processing device, the laser processing device including:
a laser oscillator that generates at least a laser beam;
a laser head that irradiates a workpiece with the laser beam; and
an articulated robot on which the laser head is mounted,
wherein the articulated robot includes
a robot arm,
an arm tip shaft that is rotatable about a predetermined axis and provided at a tip of the robot arm, and
a connector component that connects the arm tip shaft and the laser head,
the connector component has a gauge attachment portion to which a gauge is attached removably, and
the gauge has a reference point corresponding to a focal position of the laser beam,
a center line formed on a surface of the gauge and extending in a longitudinal direction of the gauge is substantially in alignment with the predetermined axis in a configuration in which the gauge is attached to the gauge attachment portion, and
the reference point is provided on the center line, the method comprising:
a first step of attaching the gauge to the connector component that is mounted on the arm tip shaft;
a second step of causing the laser head to emit a guide laser beam after the first step; and
a third step of determining whether a distance between a position irradiated with the guide laser beam on the gauge and the reference point is within a predetermined range while the second step is being performed,
wherein when a determination result in the third step is negative, a position of the laser head with respect to the arm tip shaft is adjusted, and a process goes back to the first step and a series of the first step to the third step is repeated until the determination result in the third step becomes positive.

7. The laser processing device according to claim 1, wherein the pillar-shaped member has a circular or polygonal cross section.

8. The laser processing device according to claim 5, wherein the pillar-shaped member comprises a cutout, and the center line is a scribed line formed by scribing a surface of the cutout of the pillar-shaped member.

\* \* \* \* \*